(12) United States Patent
Kerselaers et al.

(10) Patent No.: US 9,197,986 B1
(45) Date of Patent: Nov. 24, 2015

(54) ELECTROMAGNETIC INDUCTION RADIO

(71) Applicant: NXP B.V., Eindhoven (NL)

(72) Inventors: Anthony Kerselaers, Louvain (BE); Liesbeth Gommé, Heverlee (BE)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/302,791

(22) Filed: Jun. 12, 2014

(51) Int. Cl.
*H04W 4/00* (2009.01)
*H01Q 9/04* (2006.01)

(52) U.S. Cl.
CPC .............. *H04W 4/008* (2013.01); *H01Q 9/0442* (2013.01)

(58) Field of Classification Search
CPC ........... H04B 1/0458; H04B 5/02; H04B 1/18
USPC .......... 455/292, 291, 262, 41.1, 562.1, 575.6, 455/575.7; 381/312, 60
See application file for complete search history.

(56) References Cited

U.S. PATENT DOCUMENTS

| | | | | |
|---|---|---|---|---|
| 3,766,476 | A * | 10/1973 | Silitch ........................... | 455/523 |
| 5,673,054 | A * | 9/1997 | Hama ............................ | 343/744 |
| 6,424,820 | B1 * | 7/2002 | Burdick et al. ................ | 455/41.1 |
| 7,796,943 | B2 * | 9/2010 | Levan ............................. | 455/40 |
| 8,797,148 | B2 * | 8/2014 | Kato et al. ................. | 340/10.51 |
| 9,024,725 | B2 * | 5/2015 | Ikemoto ........................ | 340/10.1 |
| 2006/0134918 | A1 * | 6/2006 | Fujii et al. ..................... | 438/694 |
| 2007/0116308 | A1 * | 5/2007 | Zurek et al. ..................... | 381/312 |
| 2008/0267436 | A1 | 10/2008 | Kerselaers et al. | |
| 2009/0202084 | A1 * | 8/2009 | Joeng et al. ...................... | 381/60 |
| 2009/0315787 | A1 | 12/2009 | Schatzle | |
| 2010/0311326 | A1 | 12/2010 | Klabunde et al. | |
| 2011/0029041 | A1 * | 2/2011 | Wiskerke ......................... | 607/57 |
| 2011/0046730 | A1 * | 2/2011 | Meskens ......................... | 623/10 |
| 2011/0300801 | A1 | 12/2011 | Kerselaers | |
| 2013/0339025 | A1 * | 12/2013 | Suhami .......................... | 704/271 |
| 2015/0130465 | A1 * | 5/2015 | Wiggins et al. ............... | 324/322 |

OTHER PUBLICATIONS

Kado, Yuichi et al; "RedTacton Near-body Electric-field Communications Technology and Its Applications"; NTT Technical Review, vol. 8, No. 3; NTT Microsystem Integration Laboratories, Atsugi-shi, JP; 6 pages (Mar. 2010).

Kado, et al., "RedTacton Near-body Electric-field Communications Technology and Its Applications", NTT Technical Review, vol. 8, No. 3; NTT Microsystems Integration Laboratories, Atsugi-shi, JP;, Mar. 2010, pp. 1-6.

* cited by examiner

*Primary Examiner* — Minh D Dao

(57) ABSTRACT

A electromagnetic induction wireless communication system including: a magnetic antenna; an electric antenna; a tuning capacitor coupled to the magnetic antenna configured to tune the magnetic antenna; a controller configured to control the operation of the communication system; a signal source coupled to the controller configured to produce a communication signal used to drive the magnetic antenna and the electric antenna; a voltage control unit coupled to the signal source configured to produce one of an amplitude difference, phase difference, and an amplitude and a phase difference between the communication signal used to drive the magnetic antenna and electric antenna.

20 Claims, 4 Drawing Sheets

| ARM TO ARM SCENARIO, DISTANCE 43 CM | | MALE S21 db | FEMALE S21 db |
|---|---|---|---|
| MI | COAXIAL | -98.66 | -95.00 |
| EMI | ON 1MM SWEATER | -80.29 | -77.43 |
| EMI | TWICE CONNECTED TO SKIN | -77.80 | -73.55 |
| EMI | ONCE CONNECTED TO SKIN | -69.77 | -65.11 |

MI = MAGNETIC INDUCTION
EMI = ELECTROMAGNETIC INDUCTION

FIG. 5

| ARM TO ARM SCENARIO, DISTANCE 43 CM | | MALE S21 db | FEMALE S21 db |
|---|---|---|---|
| MI | COAXIAL | -98.66 | -95.00 |
| EMI | ON 1MM SWEATER | -74.29 | -71.43 |
| EMI | TWICE CONNECTED TO SKIN | -71.80 | -67.55 |
| EMI | ONCE CONNECTED TO SKIN | -63.77 | -59.11 |

MI = MAGNETIC INDUCTION
EMI = ELECTROMAGNETIC INDUCTION

FIG. 6

ELECTROMAGNETIC INDUCTION RADIO

TECHNICAL FIELD

Various exemplary embodiments disclosed herein relates generally to an electromagnetic induction radio.

BACKGROUND

There exist a variety of wireless systems which, illustratively, are used for short range distance communication. Some systems are used for communication around the human body; other systems may be used for communication in or around other objects. For example, currently RF based hearing aids are considered for wireless communication. Often such hearing aid systems operate in the 2.5 GHz ISM band. Such systems feature propagation by means of transverse waves, the magnetic and electric fields being in phase and covering a relatively large range of perhaps 30 meters. The large range may cause problems in terms of security of the communication content and may cause interference. Furthermore, because of their relatively high frequency of operation, such systems are heavily influenced by the human body.

Somewhat more conventional hearing aids employ magnetic field induction as a wireless communication method. Unfortunately, magnetic field induction based wireless systems have a limited range if the antenna is comparatively small, such as would be required in a hearing aid. Not all parts of the human body can be reached with magnetic field induction-based systems with small antennas. Consequently, it can be difficult to provide communication between a hearing aid and a hand-held control using such systems.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to an electromagnetic induction wireless communication system including: a magnetic antenna; an electric antenna; a tuning capacitor coupled to the magnetic antenna configured to tune the magnetic antenna; a controller configured to control the operation of the communication system; a signal source coupled to the controller configured to produce a communication signal used to drive the magnetic antenna and the electric antenna; a voltage control unit coupled to the signal source configured to produce one of an amplitude difference, phase difference, and an amplitude and a phase difference between the communication signal used to drive the magnetic antenna and electric antenna.

Further, various exemplary embodiments relate to a method of communicating near a human body including: producing a communication signal; producing a modified communication signal, wherein the modified communication signal has one of an amplitude difference, phase difference, and an amplitude and phase difference from the communication signal; applying the communication signal to one of an magnetic antenna and an electric antenna; applying the modified communication signal to the other of the magnetic antenna and the electric antenna; controlling the production of the modified communication signal to improve the method of communicating near the human body.

Further, various exemplary embodiments relate to a non-transitory machine-readable storage medium encoded with instructions for execution by a processor, the non-transitory machine-readable medium including: instructions for producing a communication signal; instructions for producing a modified communication signal, wherein the modified communication signal has one of an amplitude difference, phase difference, and an amplitude and phase difference from the communication signal; instructions for applying the communication signal to one of a magnetic antenna and an electric antenna; instructions for applying the modified communication signal to the other of the magnetic antenna and the electric antenna; instructions for controlling the production of the modified communication signal to improve the method of communicating near the human body.

BRIEF DESCRIPTION OF THE DRAWINGS

In order to better understand various exemplary embodiments, reference is made to the accompanying drawings, wherein:

FIG. 5 displays path loss measurements at 10.6 MHz of the prior art magnetic induction method and the electromagnetic induction method;

FIG. 6 displays path loss measurements at 10.6 MHz of a magnetic induction method and the electromagnetic induction method according an embodiment of the invention.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

In a related U.S. patent application Ser. No. 14/270,013 entitled "ELECTROMAGNETIC INDUCTION FIELD COMMUNICATION" filed on May 5, 2014 an electromagnetic communication method near a human body by means of a combination of a magnetic field and electric field with no intention to form transversal radiating waves is described. This results in a method that improves the link budget and extends the range to the complete body and intra-body. The magnetic field is generated by a current through a first coil. The electric field can be generated by a first coupling capacitor, having a first conducting plate coupled to the human body and a second conducting plate coupled to the environment. The wireless communication system is not galvanically connected to the ground. The magnetic and electric field can be received by a receiver at another place near the human body by means of a second coil and a second coupling capacitor, the second capacitor having a first conducting plate coupled to the human body and a second conducting plate coupled to the environment.

Figure 1:
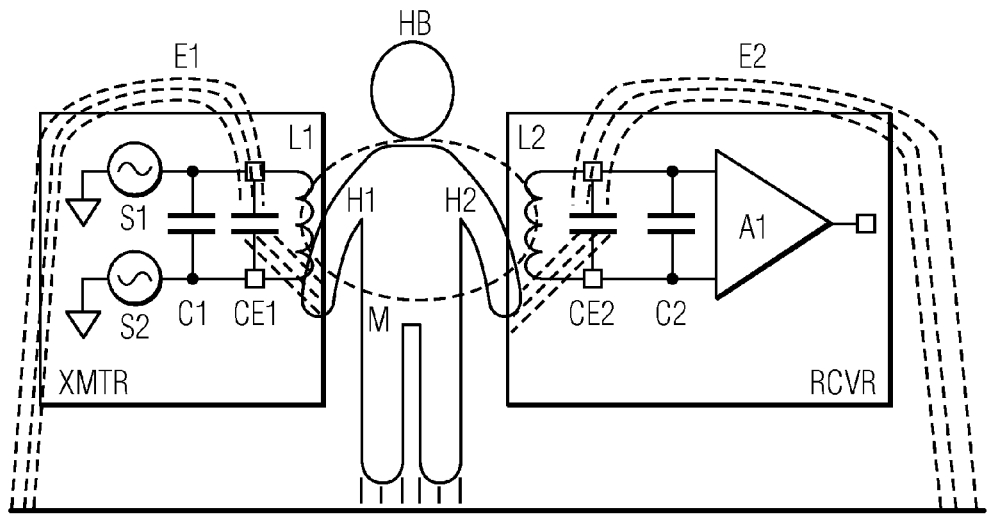
FIG. 1 illustrates a block diagram of wireless communication system.
Figure 2:
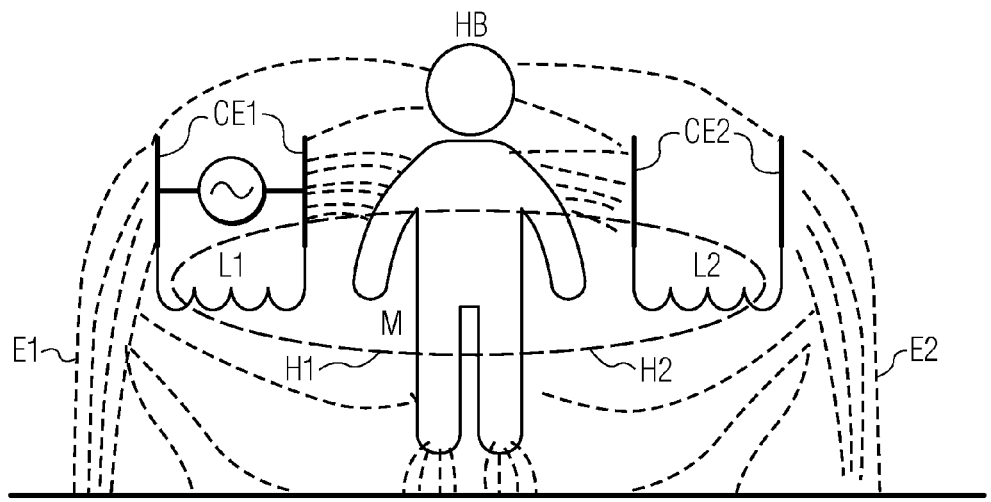
FIG. 2 illustrates a diagram of electrical and magnetic field lines during operation of the wireless communication system.

FIG. 1 illustrates a block diagram of the wireless communication system. FIG. 2 illustrates a diagram of electrical and magnetic field lines during operation of the wireless communication system. The wireless communication system of FIG. 1 includes a transmitter XMTR and receiver RCVR. Communication between transmitter XMTR and receiver RCVR is accomplished via a combination of an electric field and a magnetic field as will be further described. Magnetic field H1 is generated by current through coil L1. An electric field E1 can be generated by a voltage on coupling capacitor CE1. Coupling capacitor CE1 has a first conducting plate coupled to the human body HB and a second conducting plate coupled to the environment as will be further illustrated below. Capacitors C1 and C2 are provided to resonate their respective circuits at the required operational frequency.

Magnetic field H1 and electric field E1 may be generated by the same voltage using sources S1 and S2. Accordingly, the sources S1 and S2 produce the communication signal to be transmitted. In this illustrative embodiment the sources S1 and S2 may generate a balanced voltage across the coil L1. However the voltage across the coil L1 may also be unbalanced and in this case only one source is required.

Magnetic field H2 and electric field E2 (which have a different amplitudes than magnetic field H1 and electric field E1 respectively) may be received at a receiver RCVR positioned at another place near the human body (perhaps in the other ear) by means of a coil L2 and a coupling capacitor CE2. Coupling capacitor CE2 has a first conducting plate coupled to the human body HB and a second conducting plate coupled to the environment as will be further illustrated in FIG. 3.

This wireless communication system communicates using a wireless electromagnetic field communication method near a human body. The electromagnetic induction fields are a combination of a magnetic field H1 and electric field E1 with no intention to form transversal radiating waves. The magnetic field H1 is generated by a magnetic antenna, a coil L1, while the electric field E1 is generated by a voltage on a coupling capacitor CE1. This coupling capacitor CE1 has a first conducting plate P11 coupled to the human body HB and a second conducting plate P12 coupled to the environment. The wireless system is not galvanically connected to the ground.

A combination of magnetic field an electric field is created, and the electric field is present between the human body and the environment. The magnetic induction field decreases with 18 db for every doubling of the distance from the source, however the electric induction field decreases with only 6 db for every doubling of the distance along a human body.

The magnetic field H2 and electric field E2 can be received by a receiver at another place near the human body by means of a coil L2 and a coupling capacitor CE2, the coupling capacitor CE2 having a first conducting plate P21 coupled to the human body and a second conducting plate P22 to the environment.

Figure 3:
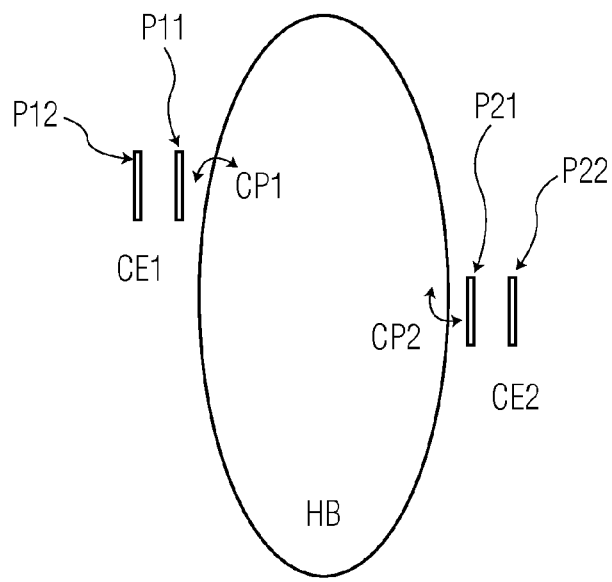
FIG. 3 illustrates the coupling capacitors CE1 and CE2 near a human body.

FIG. 3 illustrates the coupling capacitors CE1 and CE2 near a human body HB. The conductive plate P11 of coupling capacitor CE1 is coupled with the human body HB. The conductive plate P12 of coupling capacitor CE1 is coupled to the environment. The conductive plate P21 of coupling capacitor CE2 is coupled with the human body HB at another position. The conductive plate P22 of coupling capacitor CE2 is coupled to the environment. CE1 has a coupling factor CP1, and CE2 has a coupling factor CP2. The coupling factor CP1 and CP2 play a role in the path loss of the communication system.

Plates P11, P12, P21, and P22 may be made from conductive material, for example metal. In general, plates P11, P12, P21, and P22 may have a variety of shapes and may be surrounded by dielectric material so that the overall structure of CE1 and CE2 performs a capacitive function. In general, the dimensions of capacitors CE1 and CE2 should be small relative to the wavelength of operation.

However different applications may require a composition of electric and magnetic fields of different amplitudes and phase between them. Therefore a system is described below that may be integrated in a RF integrated circuit and that is suitable to generate a blending of field amplitudes and phase that may be programmed to be specifically suited for various applications. The blending can be continuously adaptable. In order to understand the effects of different amplitudes and phases between the electric and magnetic fields various tests and measurements were done. The results of these tests are discussed below and provide insight as to the benefits of varying the amplitudes and phases between the electric and magnetic fields.

Figure 4:
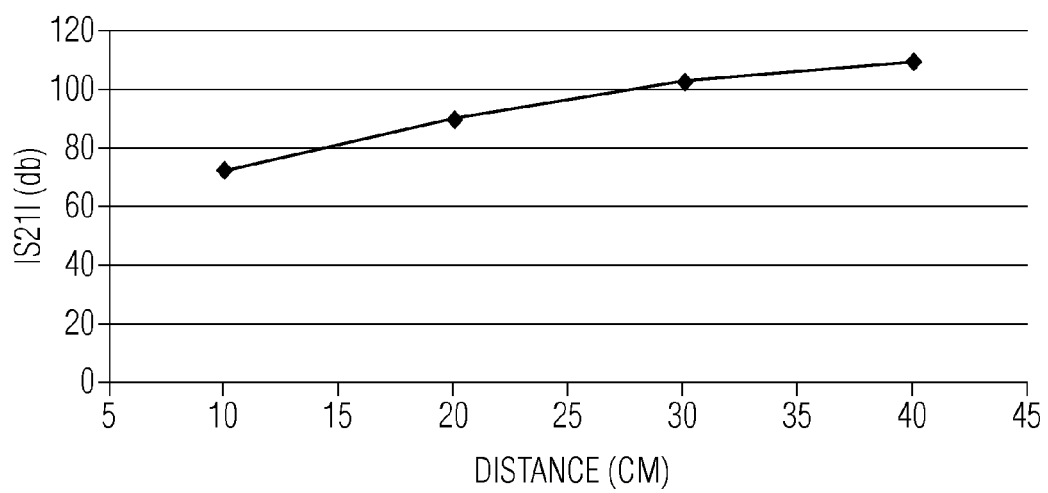
FIG. 4 displays the measured path loss versus distance of a magnetic induction communication link operating at 10.6 MHz.

FIG. 4 displays the measured path loss versus distance of a magnetic induction communication link operating at 10.6 MHz. The measurement results are valid for free space and around a human body. This is because the permittivity of a human body is close to that of air. From the measurement results it can be seen that about a 100 db path loss results for a distance of 30 cm between the two nodes. For example, for a magnetic induction based hearing aid system communication is interrupted with a path loss of 92 db. It is thus not possible to have wireless communication around all the places at the human body using this configuration.

FIG. 5 displays path loss measurements at 10.6 MHz of the prior art magnetic induction method and the electromagnetic induction method. In this example, the transmitter and receiver are positioned near the left hand and the right hand respectively of the test person. Both arms are separated by a distance of 43 cm. The test person is sitting on a chair. The amplitude of the voltage on the coil antenna (e.g., L1 in FIG. 1) and the capacitor antenna (e.g., CD1 in FIG. 1) is the same. The transmitter and receiver antennas are a combination of a ferrite coil and a coupling capacitor. The ferrite coil having a 2 mm diameter and a 7 mm length with an inductance of 3.7 uH; the coupling capacitor having dimensions of 2 by 3 cm surface area and 4 mm distance between the conducting plates, the area between them is air with a capacitance of 12 pFarad. The coupling plates P11 and P21 where isolated from the Human Body by means of clothes with a thickness of 2 to 3 mm. Magnetic induction measurements (MI) and electromagnetic induction measurements (EMI) are shown for both a male and female subjects. Different use cases are studied for the electromagnetic induction method, both antennas are separated 1 mm from the skin of the test person, the antennas connected to the skin of the test person and only the coupling capacitor connected to the skin of the test person. It is noted that in all use cases the electromagnetic induction method has at least 17.57 db lower loss compared with the magnetic induction method. In this case the same voltage is applied to the coil antenna and the capacitor antenna.

FIG. 6 displays path loss measurements at 10.6 MHz of a magnetic induction method and the electromagnetic induction method according an embodiment of the invention. In this example, the transmitter and receiver are positioned near the left hand and the right hand respectively of the test person. Both arms are separated a distance of 43 cm. The test person is sitting in a chair. For the measurements illustrated in FIG. 6 the amplitude of the voltage on the capacitor antenna (e.g., CE1 in FIG. 1) is twice the voltage on the coil antenna (e.g., L1 in FIG. 1). The transmitter and receiver antennas are a combination of a ferrite coil and a coupling capacitor. The ferrite coil having 2 mm diameter and 7 mm length with an inductance of 3.7 uHenry; the coupling capacitor having dimensions of 2 by 3 cm surface area and 4 mm distance between the conducting plates, the area between them is air with a capacitance of 12 pFarad. The coupling plates P11 and P21 where isolated from the Human Body by means of clothes with a thickness of 2 to 3 mm. In this case the voltage on the capacitor antenna is twice the voltage on the coil antenna. Different use cases are studied for the electromagnetic induction method, both antennas are separated 1 mm from the skin of the test person, the antennas connected to the skin of the test person and only the coupling capacitor connected to the skin of the test person. It can be noticed that in all use cases the electromagnetic induction method has at least 23.57 db lower loss compared with the magnetic induction method.

From FIG. 5 and FIG. 6 it can be seen that the path loss for the electromagnetic induction system can be changed. Different path loss values can be obtained by means of varying the phase and amplitude of the magnetic and the electric field that is generated by the wireless communication system. Thus a system that varies the amplitude and phase of the voltage applied to the coil antenna and the capacitor antenna may be used to improve the performance of the wireless communication system.

Figure 7:
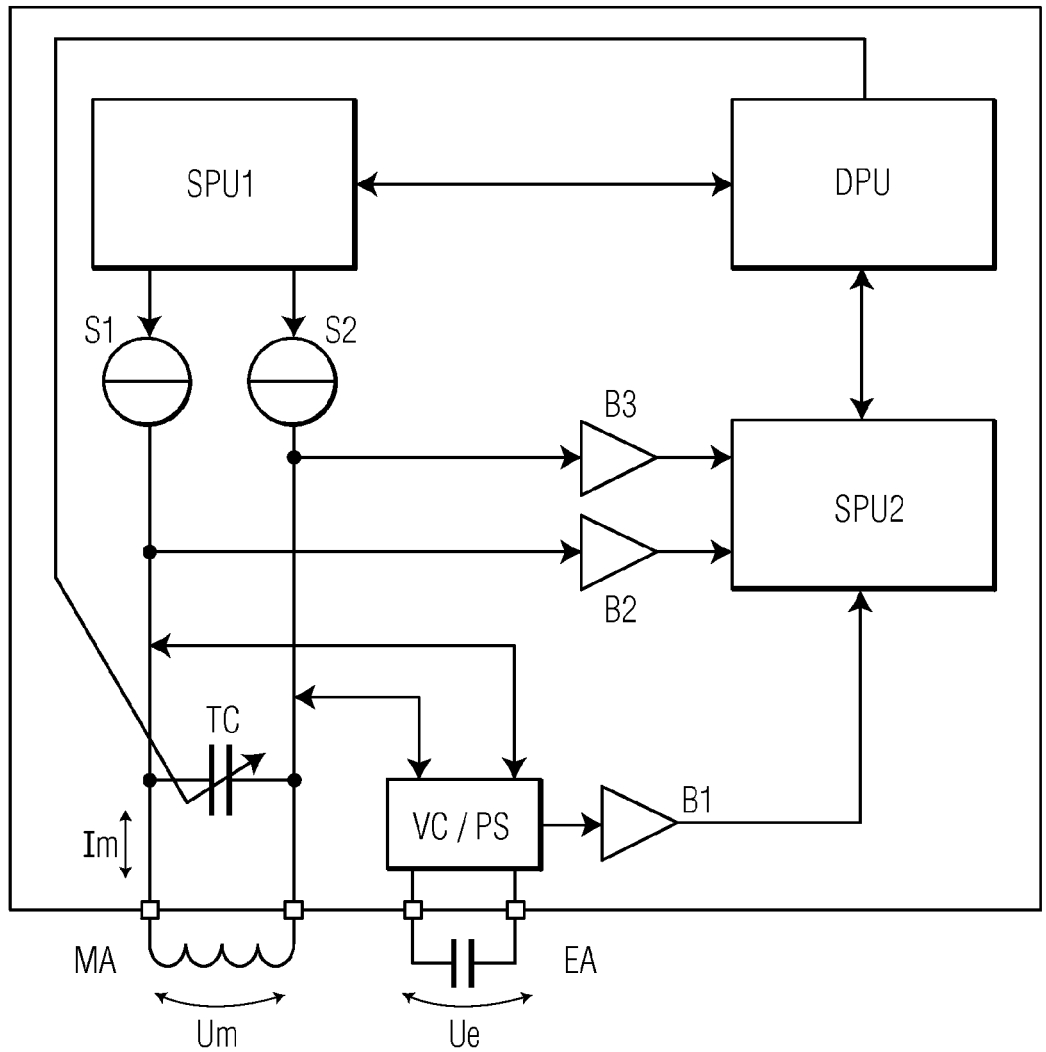
FIG. 7 illustrates block diagram of an embodiment of an electromagnetic induction radio.

FIG. 7 illustrates block diagram of an embodiment of an electromagnetic induction radio. The electromagnetic induction radio (EIR) may include a digital processing unit DPU, signal processing units SP1 and SP2, signal generators S1 and S2, buffers B1, B2, and B3, a tuning capacitor TC, a voltage processing unit VC/PS, an magnetic antenna coil MA, and an electric antenna capacitor EA.

The digital processing unit DPU may control the operation of the EIR and processes the signals related to the communication. The digital processing unit may contain analog digital converters (ADC) and/or digital analog converters (DAC), memory, storage, and all the hardware and software required to process the communication signals. The digital processing unit may include a processor that may be any hardware device capable of executing instructions stored in a memory or other storage or otherwise processing data. As such, the processor may include a microprocessor, field programmable gate array (FPGA), application-specific integrated circuit (ASIC), or other similar devices. The memory may include various memories such as, for example L1, L2, or L3 cache or system memory. As such, the memory may include static random access memory (SRAM), dynamic RAM (DRAM), flash memory, read only memory (ROM), or other similar memory devices. The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. For example, the storage may store a base operating system for controlling various basic operations of the hardware. It may also store data received and processed by the EIR. Also, the storage my include instructions used to process the data received by the EIR.

Signal processing units SPU1 and SPU2 may contain the required hardware to interface to the antenna circuitry MA and EA and the digital processing unit DPU. SP1 and SP2 may include a processor that may be any hardware device capable of executing instructions stored in a memory or other storage or otherwise processing data. As such, the processor may include a microprocessor, a signal processor, graphics processor, field programmable gate array (FPGA), application-specific integrated circuit (ASIC), or other similar devices. The signal processing unit SPU1 may help implement the transmitter function while the signal processing unit SPU2 may help implement the receiver function. In such a case the EIR may have a transceiver functionality and thus may be able to perform bidirectional communication.

In a transmitter mode, the magnetic field Um is generated by a first alternating current $I_m$ through a magnetic antenna, coil MA, while the electric field Ue is generated by a second alternating voltage $V_e$ on the electric antenna capacitor EA. The current $I_m$ through the coil MA is dependent on the voltage on the coil:

$$I_m = V_m / Z_{coil},$$

$$Z_{coil} = 2\pi f L_{coil}$$

The two voltages $V_m$ and $V_e$ thus define the magnetic and electric fields Um and Ue respectively. Changing one of the amplitudes of $V_m$ and $V_e$ or the phase between them, changes the combination of the magnetic field Um and electric field Ue and thus blending of the fields may be done in order to improve the performance of the wireless communication system.

Signal processing unit SPU1 may command signal generators S1 and S2 to produce currents that drive the resonating circuit formed by coil MA and tuning capacitor TC. Accordingly, the sources S1 and S2 produce the communication signal to be transmitted. In this illustrative embodiment the sources S1 and S2 may generate a balanced voltage across MA. However the voltage across MA may also be unbalanced and in this case only one source is required. TC is an integrated capacitor bank that may be adjusted by the digital processing unit DPU to tune the receiver/transmitter. The resonating frequency can be chosen in one of the industrial, scientific, and medical (ISM) bands, for example 10.6 MHz. The resonating circuit may have a bandwidth that is sufficient for the required communication mode data rate. Optionally the bandwidth may be adapted by means of inserting additional loss in the resonating circuit using, for example, a resistor bank which may have an adjustable resistance. This may be an additional functional block in the EIR.

The voltage $V_m$ on the magnetic antenna MA is processed in the voltage processing unit VC/PS and further applied to the electric antenna EA. The VC/PS produces a voltage $V_e$ that is applied to the electric antenna EA. The VC/PS may reduce or increase the input voltage $V_e$ relative to $V_m$. The VC/PS may additionally also change the phase between $V_m$ and $V_e$. In this way the composition of magnetic and electric fields may be changed according to the needs of the application. Alternatively the voltage Ve that is applied to the electric antenna EA is processed in the voltage processing unit VC/PS and further applied to the magnetic antenna MA. The VC/PS produces a voltage Vm that is applied to the magnetic antenna MA. The VC/PS may reduce or increase the input voltage $V_m$ relative to $V_e$. The VC/PS may additionally also change the phase between $V_e$ and $V_m$. In this way the composition of magnetic and electric fields may be changed according to the needs of the application.

In the receive mode the voltage received by the magnetic antenna MA may be combined with the voltage received by the electric antenna EA. Before combining both signals the phase and/or amplitude between them may be adapted.

For example, when both signals are combined in a parallel tuned circuit, the amplitude of the induced antenna voltages should have a 180 degree phase shift between them to generate an optimal combined output signal. This may not always be desirable for all applications due to antenna design and positioning at the human body. Moreover the phase between them may change dynamically and the VC/PS may continuously respond to such changes.

The signal processing unit SPU2 may process the received voltages from the antennas MA and EA. It is noted that the VC/PS may have bidirectional functionality. The signal at the resonating circuit formed by TC and MA may be buffered by buffers B2 and B3. An additional buffer B1 may be available to monitor the difference between received magnetic and electric field strength. Alternatively, the receiver and transmitter can also have separate receive and transmit VC/PS.

The DPU may adjust the amplitude and phase characteristics between the electric and magnetic fields used to implement communication between a transmitter and a receiver. Information regarding the communication environment may be based upon various collected test data. Also, test measurements may be made for each individual user of the communication system. Further, various channel measurement signals may be included as part of the communication signal in order to determine variations in the communication channel during the operation of the wireless communication system. These channel measurements may then be used to adjust the phase and amplitude between the magnetic and electric fields. Further, feedback loops may be used to further monitor and adjust the phase and amplitude of between the magnetic and electric signals.

The EIR may be implemented as a combination of different integrated circuits (ICs) or on a single IC. Further, the DPU, SPU1, and SPU2 are shown as separate physical and functional blocks in FIG. 7, but the DPU, SPU1, and the SPU2 may be implemented in a single processor which may be its own IC. Also, SPU1 and SPU2 may be implemented on a single signal processing unit which may be its own IC. The DPU or the combination of the DPU, SPU1, and SPU2 may be called a controller that controls the operation of the EIR.

It should be appreciated by those skilled in the art that any block diagrams herein represent conceptual views of illustrative circuitry embodying the principles of the invention. Further, in the circuits shown additional elements may also be included as needed, or variations to the structure of the circuit may be made to achieve the same functional results as the circuits illustrated.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An electromagnetic induction wireless communication system comprising:
    a magnetic antenna;
    an electric antenna;
    a tuning capacitor coupled to the magnetic antenna configured to tune the magnetic antenna;
    a controller configured to control the operation of the communication system;
    a signal source coupled to the controller configured to produce a communication signal used to drive the magnetic antenna and the electric antenna;
    a voltage control unit coupled to the signal source configured to produce one of an amplitude difference, phase difference, and an amplitude and a phase difference between the communication signal used to drive the magnetic antenna and electric antenna.

2. The system of claim 1, wherein voltage control unit is coupled to the electric antenna.

3. The system of claim 1, wherein voltage control unit is coupled to the magnetic antenna.

4. The system of claim 1, wherein the system is a transceiver.

5. The system of claim 1, wherein the controller includes a data processing unit and signal processing unit.

6. The system of claim 1, wherein the controller includes a data processing unit, a first signal processing unit, and a second signal processing unit, wherein the first signal processing unit is part of a receiver portion of the system and the second signal processing unit is part of a transmitter portion of the system.

7. The system of claim 1, wherein tuning capacitor is adjustable by the controller.

8. The system of claim 1, comprising a variable resistor coupled to the tuning capacitor and the magnetic antenna.

9. The system of claim 1, wherein the voltage control unit has an output connected to the controller, wherein the output produces a signal indicating a difference in a received magnetic field strength and a received electric field strength.

10. A method of communicating near a human body comprising:
    producing a communication signal;
    producing a modified communication signal, wherein the modified communication signal has one of an amplitude difference, phase difference, and an amplitude and phase difference from the communication signal;
    applying the communication signal to one of a magnetic antenna and an electric antenna;
    applying the modified communication signal to the other of the magnetic antenna and the electric antenna;
    controlling the production of the modified communication signal to improve the method of communicating near the human body.

11. The method of claim 10, further comprising receiving a radiated signal.

12. The method of claim 10, further comprising tuning the magnetic antenna.

13. The method of claim 12, wherein tuning the magnetic antenna includes varying the capacitance of a tuning capacitor coupled to the magnetic antenna.

14. The method of claim 13, further comprising adjusting a variable resistor coupled to the tuning capacitor and the magnetic antenna.

15. The method of claim 10, further comprising:
monitoring signals at the magnetic antenna and the electric antenna; and
adjusting the modified communication signal based upon the monitored signals.

16. A non-transitory machine-readable storage medium encoded with instructions for execution by a processor, the non-transitory machine-readable medium comprising:
instructions for producing a communication signal;
instructions for producing a modified communication signal, wherein the modified communication signal has one of an amplitude difference, phase difference, and an amplitude and phase difference from the communication signal;
instructions for applying the communication signal to one of a magnetic antenna and an electric antenna;
instructions for applying the modified communication signal to the other of the magnetic antenna and the electric antenna;
instructions for controlling the production of the modified communication signal to improve the method of communicating near the human body.

17. The non-transitory machine-readable storage medium of claim 16, further comprising receiving a radiated signal.

18. The non-transitory machine-readable storage medium of claim 16, further comprising tuning the magnetic antenna.

19. The non-transitory machine-readable storage medium of claim 18, wherein tuning the magnetic antenna includes varying the capacitance of a tuning capacitor coupled to the magnetic antenna.

20. The non-transitory machine-readable storage medium of claim 19, further comprising adjusting a variable resistor coupled to the tuning capacitor and the magnetic antenna.

* * * * *